(12) United States Patent
Hayashi

(10) Patent No.: US 7,735,087 B2
(45) Date of Patent: Jun. 8, 2010

(54) TASK SWITCHING APPARATUS, METHOD AND PROGRAM

(75) Inventor: Kunihiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1432 days.

(21) Appl. No.: 10/796,213

(22) Filed: Mar. 10, 2004

(65) Prior Publication Data

US 2004/0181791 A1    Sep. 16, 2004

(30) Foreign Application Priority Data

Mar. 13, 2003    (JP)    ............... 2003-068831

(51) Int. Cl.
*G06F 9/46*    (2006.01)

(52) U.S. Cl. .................. 718/107; 718/102; 718/103

(58) Field of Classification Search ......... 718/100–107; 709/104, 213; 370/395.4–395.42
See application file for complete search history.

(56) References Cited

U.S. PATENT DOCUMENTS

| | | | |
|---|---|---|---|
| 5,021,993 A | | 6/1991 | Matoba et al. |
| 5,109,512 A | | 4/1992 | Bahr et al. |
| 5,349,680 A | | 9/1994 | Fukuoka |
| 5,452,452 A | | 9/1995 | Gaetner et al. |
| 5,524,247 A | | 6/1996 | Mizuno |
| 5,628,013 A | * | 5/1997 | Anderson et al. ............ 718/107 |
| 5,729,766 A | | 3/1998 | Cohen |
| 5,774,718 A | * | 6/1998 | Aoshima et al. ............ 718/100 |
| 5,812,844 A | * | 9/1998 | Jones et al. ................. 718/104 |
| 5,872,950 A | | 2/1999 | Levitan et al. |
| 5,991,873 A | | 11/1999 | Seto et al. |
| 6,006,293 A | | 12/1999 | Thomas |
| 6,052,707 A | * | 4/2000 | D'Souza ..................... 718/106 |
| 6,105,048 A | * | 8/2000 | He ............................ 718/100 |
| 6,216,220 B1 | | 4/2001 | Hwang |
| 6,223,208 B1 | | 4/2001 | Kiefer et al. |
| 6,310,921 B1 | | 10/2001 | Yoshioka et al. |
| 6,408,325 B1 | | 6/2002 | Shaylor |
| 6,430,594 B1 | * | 8/2002 | Akiyama et al. ............ 718/108 |

(Continued)

FOREIGN PATENT DOCUMENTS

JP    55-115155    9/1980

(Continued)

OTHER PUBLICATIONS

Guangzuo Cui et al. Parallel Replacement Mechanism for MultiThread, Advances in Parallel and Distributed Computing, 1997. Proceedings, p. 338-344, Mar. 19-21, 1997.

(Continued)

*Primary Examiner*—Meng-Ai An
*Assistant Examiner*—Jennifer N To
(74) *Attorney, Agent, or Firm*—Wenderoth, Lind & Ponack, L.L.P.

(57) ABSTRACT

A method of assigning task management blocks for first type tasks to time slot information on a one-by-one basis, assigning a plurality of task management blocks for second type tasks to time slot information, selecting a task management block according to a priority classification when switching to the time slot of the time slot information, and switching to the time slot except the time slot information. Additionally, a task switching apparatus selects the task management block assigned to the time slot and executes the task.

6 Claims, 11 Drawing Sheets

U.S. PATENT DOCUMENTS

| | | | |
|---|---|---|---|
| 6,470,376 B1 | 10/2002 | Tanaka et al. | |
| 6,496,848 B1 | 12/2002 | Nankaku | |
| 6,684,342 B1 | 1/2004 | Kelsey et al. | |
| 6,757,897 B1* | 6/2004 | Shi et al. | 718/102 |
| 6,865,636 B1 | 3/2005 | Hober et al. | |
| 7,010,612 B1 | 3/2006 | Si et al. | |
| 7,039,012 B2* | 5/2006 | Nakano et al. | 370/230 |
| 7,047,396 B1 | 5/2006 | Fotland et al. | |
| 7,082,519 B2 | 7/2006 | Kelsey et al. | |
| 7,120,783 B2 | 10/2006 | Fotland et al. | |
| 7,207,045 B2* | 4/2007 | Goiffon | 718/107 |
| 7,308,686 B1 | 12/2007 | Fotland et al. | |
| 7,546,442 B1 | 6/2009 | Fotland et al. | |
| 2002/0002667 A1 | 1/2002 | Kelsey et al. | |
| 2002/0038416 A1 | 3/2002 | Fotland et al. | |
| 2002/0073129 A1 | 6/2002 | Wang et al. | |
| 2002/0174164 A1* | 11/2002 | Hayashi | 709/102 |
| 2003/0037091 A1* | 2/2003 | Nishimura et al. | 709/103 |
| 2003/0037228 A1 | 2/2003 | Kelsey et al. | |
| 2003/0093457 A1* | 5/2003 | Goldick | 709/104 |
| 2004/0064817 A1* | 4/2004 | Shibayama et al. | 718/104 |
| 2006/0069738 A1* | 3/2006 | Hoogerbrugge | 718/213 |

FOREIGN PATENT DOCUMENTS

| | | |
|---|---|---|
| JP | 61-150039 | 7/1986 |
| JP | 62-266625 | 11/1987 |
| JP | 4-101233 | 4/1992 |
| JP | 5-46413 | 2/1993 |
| JP | 5-127926 | 5/1993 |
| JP | 5-204675 | 8/1993 |
| JP | 6-67905 | 3/1994 |
| JP | 6-149599 | 5/1994 |
| JP | 07-044401 | 2/1995 |
| JP | 7-210400 | 8/1995 |
| JP | 07-295694 | 11/1995 |
| JP | 8-190491 | 7/1996 |
| JP | 8-235004 | 9/1996 |
| JP | 9-16409 | 1/1997 |
| JP | 9-128248 | 5/1997 |
| JP | 9-282182 | 10/1997 |
| JP | 10-143376 | 5/1998 |
| JP | 10-171667 | 6/1998 |
| JP | 10-207717 | 8/1998 |
| JP | 10-307731 | 11/1998 |
| JP | 10-341422 | 12/1998 |
| JP | 2000-20323 | 1/2000 |
| JP | 2000-66904 | 3/2000 |
| JP | 2003-271399 | 9/2003 |
| WO | 00/79389 | 12/2000 |
| WO | 01/38968 | 5/2001 |

OTHER PUBLICATIONS

Japanese Office Action issued Oct. 9, 2007 in connection with corresponding Japanese Patent Application No. 2003-068831 (with English Translation).

Japanese Office Action issued Oct. 2, 2007 in connection with Japanese Patent Application No. 2005-287949 (with English Translation).

Japanese Office Action issued Oct. 2, 2007 in connection with Japanese Patent Application No. 2005-287950 (with English Translation).

Japanese Office Action issued Jan. 24, 2006 in connection with Japanese Patent Application No. 2003-001616 (with English Translation).

Japanese Office Action issued Aug. 2, 2005 in connection with Japanese Patent Application No. 2003-001616 (with English Translation).

Japanese Office Action issued Nov. 2, 2004 in connection with Japanese Patent Application No. 2003-001616 (with English Translation).

* cited by examiner

TASK SWITCHING APPARATUS, METHOD AND PROGRAM

BACKGROUND OF THE INVENTION (1) Field of the Invention

The present invention relates to task switching in computer operating systems, and in particular, to a task switching apparatus for switching the task to be completed in a processor by switching to the time slot to which a task is assigned.

(2) Description of the Related Art

Main operations of computer operating systems are hardware management, task management, data management and input/output management. Task management in those operations is for managing task execution sequence and an important function for having a CPU, a memory, an input/output device and the like operate efficiently.

Task is a control unit for performing a centralized control on the program operation flow such as its startup, execution and end. Programs that operate under the management of the computer operating systems are used as tasks, and operations in the computer operating system relating to the program are completed on the basis of task.

There are algorithms for determining task execution sequence called time sharing scheduler system or priority switching method. The time sharing scheduler system is a method where a certain execution time is assigned to a task, an execution right of a processor is given to the processor during the assignment time, and the execution right of a processor is given to another processor after the assignment time. This method makes it possible to assign the execution right in certain execution time to all the tasks equally.

Also, as to the priority switching method, patent library 1 and 2 disclose a scheduling apparatus for switching tasks according to task priorities.

(Patent Library 1) Japanese Laid-Open Patent application No. 2000-20323.

(Patent Library 2) Japanese Laid-Open Patent application No. 1992-101233.

However, the above-mentioned prior art includes a problem that designing programs is difficult in that a programmer specifies the priority of each task in order to secure the necessary performance of each task, and that alteration of the programs cannot be flexibly made once they are designed.

SUMMARY OF THE INVENTION

An object of the present invention is to provide a task switching apparatus with flexibility in designing programs by facilitating program designing for specifying priorities in order to satisfy necessary performance of each task.

In order to achieve above-mentioned object, the task switching apparatus of the present invention is for switching execution of a task assigned to a time slot by switching time slots in a processor and the task switching apparatus comprises an assigning unit operable to assign each of a plurality of first type tasks to a time slot and a plurality of second type tasks different from the first type tasks to a specified time slot and a task selecting unit operable to select a task assigned to the time slot when the after-switching time slot is not the specified time slot or select a task from the plurality of second type tasks when the after-switching time slot is the specified time slot so as to execute the task.

This structure assigns a time slot to the first type task one by one, as a result, the first type task is completed at least once within a period including all the time slots, which assures a processing performance in series. On the other hand, a time slot is assigned to the second type tasks in many versus one basis, as a result, a processing performance in series is not assured. As a result, the programmer should classify the tasks required to satisfy the processing performance in series into the first type without taking the priorities into account. Also, the programmer should classify tasks that do not require processing performance into the second type. This makes assigning a priority to each of all tasks unnecessary, facilitates program designing for securing processing performance and secures flexibility in program designing.

Here, the second type tasks have priorities and the task selecting unit may be the structure that selects one task out of a plurality of the second type tasks according to the priorities.

In this structure, the second type tasks are completed starting from the one with the highest priority, the programmer can design and alter programs easily because the programmer does not need to take into account the priorities of the first type tasks and can classify the tasks that does not require the processing performance in series into the second type so as to assign priorities to them.

Also, the assigning unit may be constructed so that it can regard the residual time obtained by subtracting the total time of the time slots where the first type tasks are assigned from the predetermined period of time as the time assigned to the above-mentioned specific time slot.

In this structure, as the second type tasks are completed in the above-mentioned residual time, it is possible to eliminate the possibility that executing the second type tasks affects the processing performance of each of the first type tasks.

Further, the assigning unit may be constructed so that it can calculate the residual time to regard the time as the specific time slot each time a new first type task is assigned to a time slot.

This structure makes it possible to dynamically assign the maximum residual time to the second type tasks securing the processing performance of each of the first type tasks.

Also, if the total of the assignment time of already assigned tasks and the assignment time of the new task exceeds the time of the period when trying to add a new first type task to the time slot, the above-mentioned first type tasks are tasks with a specification of assignment time and it may be constructed so that it can reject assigning the new task to the time slot.

This structure can assure processing performance of the existing first type tasks by eliminating adding the new first type task.

Further, the task switching apparatus may have the structure further comprising: a storing unit operable to store lock information showing whether a resource capable of being accessed by a task is in a lock state because of access by any of tasks or not; and a changing unit operable to change a state of a task from an executable state to a waiting state when the task under execution is trying to access a resource in a lock state and change a state of the task from a waiting state to an executable state when the resource is unlocked, and wherein the task selecting unit eliminates a task in a waiting state from selecting targets.

Also, the task switching apparatus may further comprise: a shifting unit operable to shift the processor to a power-saving state when no executable tasks is included in first type and second type tasks.

Here, the processor equips at least two register sets for storing task contexts, and the task switching apparatus may further comprise: a switching unit operable to prepare one of the register sets for using it for a task under execution, return the context of a task to be completed next to another register set using background processing and switch register sets when switching time slots.

In this structure, it is possible to switch register sets instead of executing save or return of the context by executing a program, which makes it possible to accelerate task switching. Also, it returns the context of the task to be completed next using background processing, which makes it possible to accelerate task switching efficiently utilizing idle processing of processor time and the like.

The task switching apparatus of the present invention as explained up to this point, the programmer should classify the tasks require to satisfy the processing performance in series into the first type without taking the priorities into account and classify the tasks that do not require processing performance into the second type. Doing so makes it possible to make assigning a priority to each of all tasks becomes unnecessary and make program designing for securing processing performance easier, which brings an effect of securing flexibility in program designing.

Also, as the second type tasks are completed starting from the one with a higher priority, the programmer should classify tasks that do not require the processing performance in series so as to assign priorities to them instead of taking into account the priorities of the first type tasks, which makes it possible to facilitate program designing and alteration.

Also, the task switching method and its program of the present invention have the same structure as the one mentioned above and has the same act and effect.

FURTHER INFORMATION ABOUT TECHNICAL BACKGROUND TO THIS APPLICATION

Japanese Patent application No. 2003-068831 filed on Mar. 13, 2003, is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

[Overall Structure]

Figure 1:
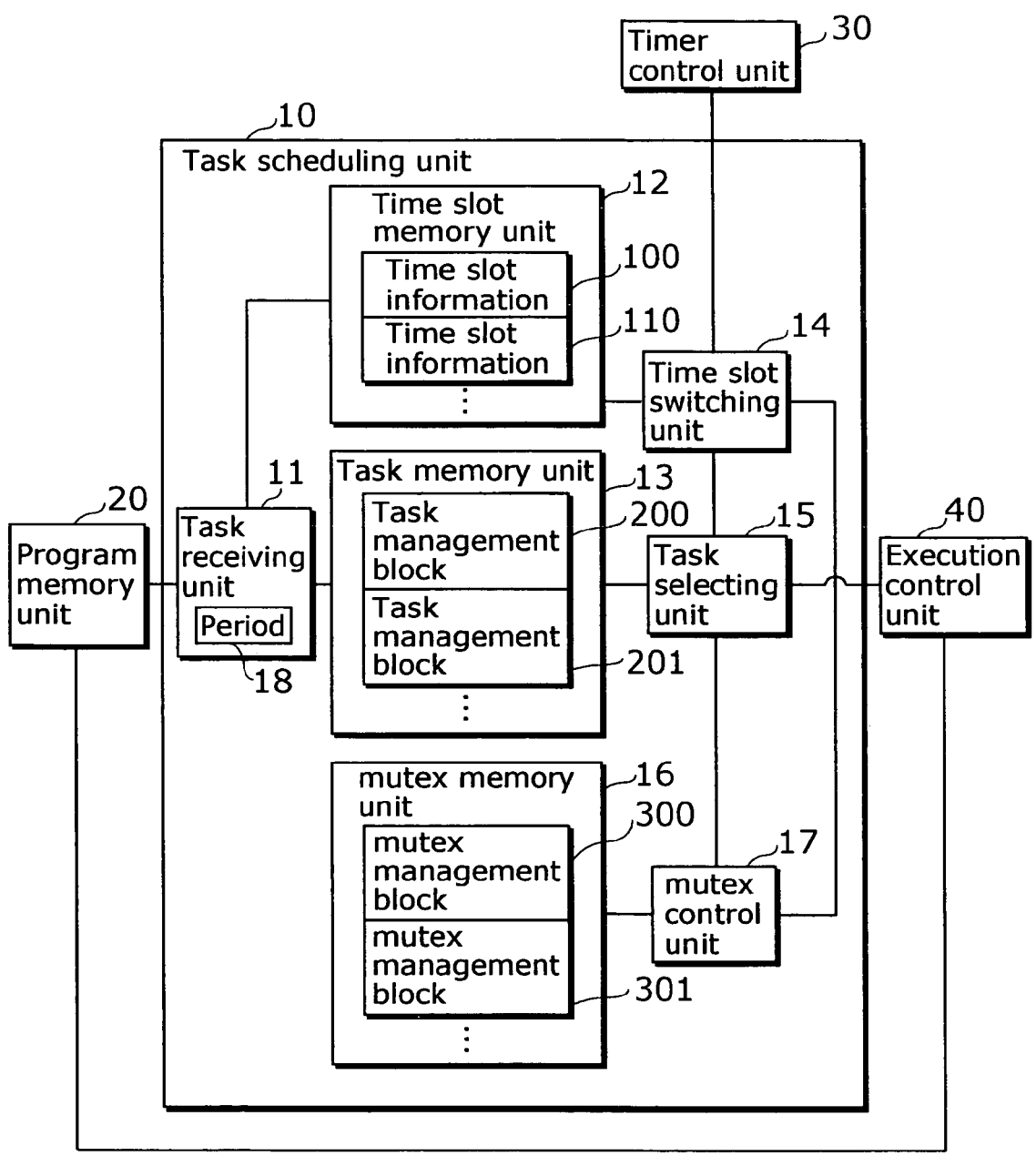
FIG. 1 is a block diagram showing the structure of the main part of a program executing apparatus for performing task switching in the embodiment of the present invention.

FIG. 1 is a block diagram showing the structure of the main part of the program executing apparatus for performing task switching in the embodiment of the present invention. The figure schematically shows the function realized by executing software for performing task switching as a function of a computer operating system in a processor. The hardware structure of the processor may be the one generally used.

This program execution apparatus is constructed so that it can execute two kinds of tasks of a task with assignment time and a task with a priority, secure necessary performance of the former task and select the latter task so as to execute it according to the priority.

The program executing apparatus comprises a task scheduling unit 10, a program memory unit 20, a timer control unit 30 and an execute control unit 40 shown in the figure.

The task scheduling unit 10 performs scheduling of two kinds of tasks. In the other words, to the former tasks, the task scheduling unit 10 assigns a time slot to each of the tasks with the specification of assignment time and performs time sharing scheduler system where each task is selected at least once in a predetermined period. To the latter tasks, the task scheduling unit 10 performs scheduling for selecting a task out of a plurality of tasks with priorities in the residual time of the total time of the above time slots in a period. Here, time slots are placed periodically in order to divide time for executing a program in a processor on a basis of assignment time.

The program memory unit 20 is, for example, a computer-readable storage medium that stores a program, which is the task body, to be a scheduling target performed by the task scheduling unit 10 and information on the program.

The timer control unit 30 starts counting time and outputs a timeout when it reaches to the assignment time every time the task scheduling unit 10 sets the assignment time. The task scheduling unit 10 is notified of these timeouts as timing for switching time slots.

The execution control unit 40 executes tasks selected by the task scheduling unit 10. The execution control unit 40 corresponds to hardware for executing tasks of the processor.

[Structure of the Task Scheduling Unit 10]

The task scheduling unit 10 comprises a task receiving unit 11, a time slot memory unit 12, a task memory unit 13, a time slot switching unit 14, a task selecting unit 15, a mutex memory unit 16 and a mutex control unit 17.

<1. Task Receiving Unit 11>

The task receiving unit 11 receives a request for adding a task according to the instruction by a user operation, a user program or the like, reads out "task information", "priorities" and "assignment time" as information concerning the task from the program memory unit 20, generates time slot information and task management blocks so as to make the task to be a scheduling target, and sets time slot information and task management blocks in the time slot memory unit 12 and the task memory unit 13 respectively.

Here, "task information" includes a program start address and a stack pointer. The program start address is the leading address where a task is written. The stack pointer is location information showing the storage place for saving the task status when task switching occurs.

"Priority" is used as a standard for classifying tasks into two categories: one is for tasks with specification of assignment time, and the other is for tasks with a priority, and priorities of tasks in the latter category are shown.

In other words, tasks with priority 0 are the ones with assignment time (called type A tasks from here) and tasks except tasks with priority 0 (called type B tasks from here) respectively, and each of these tasks in the two categories has meanings below.

The type A tasks, which are the ones with the specification of assignment time, are assigned to time slots one by one in the task scheduling unit 10, and the task is surely completed during the assignment time of the time slot. As the processing performance depends on the length of the execution time, the so-called time-driven task should be type A. For example, it is preferable that tasks that require a certain processing performance in series such as decode/encode processing of video data or voice data are determined as type A tasks.

The type B task is assigned to a time slot together with other type B tasks, tasks with higher priorities are completed during the assignment time of the time slots. Here, the priorities are shown in a form of values 1, 2, 3, and so on starting from the highest priority. The so-called event-driven task should be type B. For example, it is preferable that a task which performs processing for displaying a menu composed with letters and still pictures when a user operation is an event and occurs irregularly although it does not require a certain processing performance in series is determined as type B tasks. In this case, for example, a task for processing an event that requires quicker response speed should have a higher priority.

"Assignment time" is effective only when the task is type A, and it is a value for specifying assignment time of a time slot corresponding to a task. This assignment time and priority are determined by the program.

Also, the task receiving unit 11 deletes time slot information and task management blocks of the task stored in the time slot memory unit 12 or the task memory unit 13 when an instruction by a user operation or from a user program is made or when the task are completed.

<2. Time Slot Memory Unit 12>

The time slot memory unit 12 stores time slot information for generating time slots that are standards for task switching.

Figure 2:
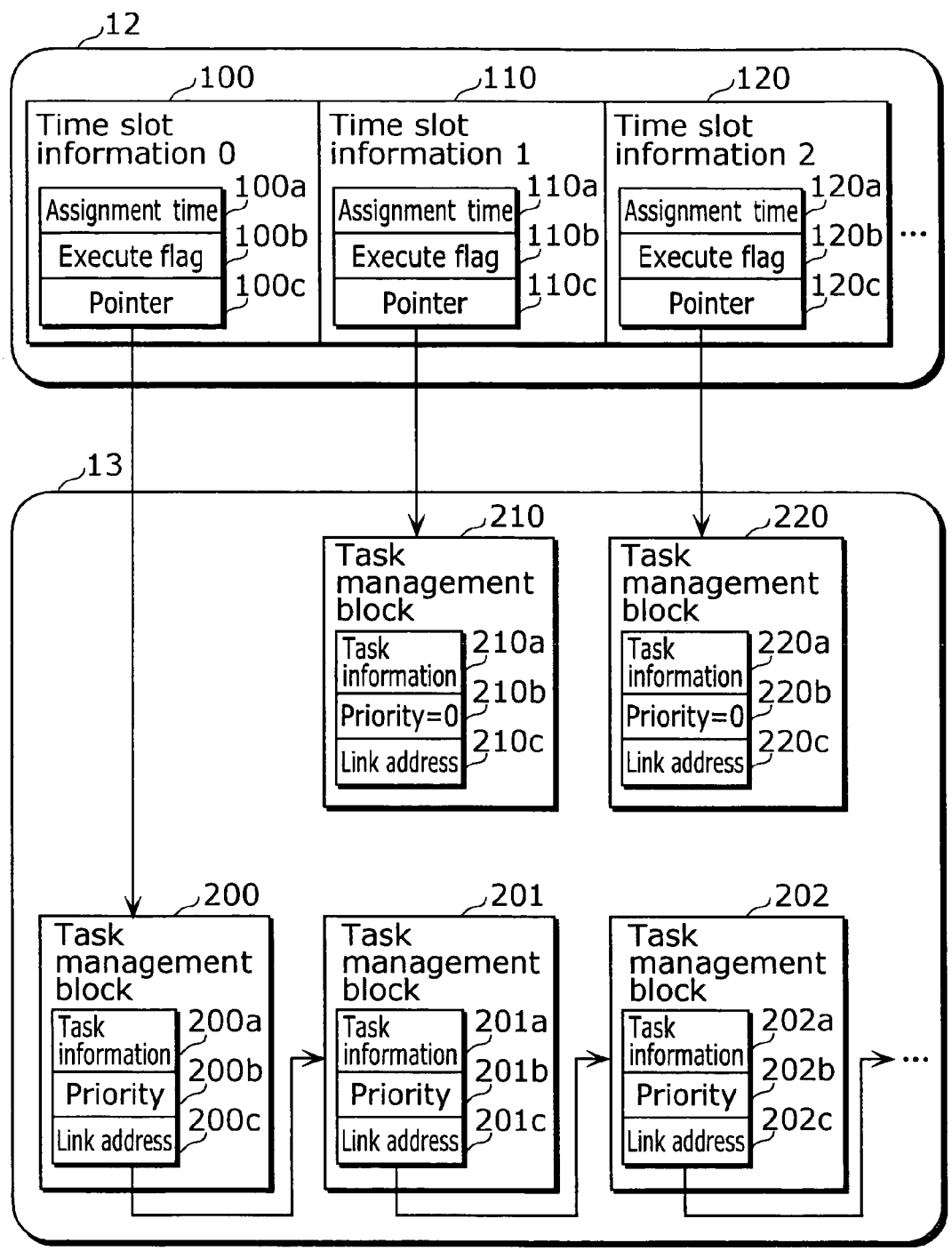
FIG. 2 is a diagram showing examples of time slot information inside the time slot memory unit and a task management block inside the task memory unit.

FIG. 2 is a diagram showing examples of time slot information inside the time slot memory unit 12 and task management blocks inside the task memory unit 13. As shown in the figure, the time slot memory unit 12 stores a plurality of time slot information 100, 110, 120 and so on. The time slot information 100 shows time slots where a plurality of type B tasks are assigned. This time slot information 100 may previously generate time slots even when there is no type B task. Time slot information 110, 120 and so on other than this show time slots to which type A tasks are assigned. The time slot information 100 corresponds to one of time slots and comprises an assignment time 100a, a flag 100b and a pointer 100c. This is true of other time slot information.

The assignment time shows time for executing the task corresponds to the time slot. Time slots are switched when it reaches the assignment time for executing the task. Assignment time 110a and 120a corresponding to type A tasks are set at the same time when generating time slot information. Assignment time 100a corresponding to a plurality of type B tasks is the residual time after the total time of assignment time 110a, 120a and so on of the other time slots are subtracted from a period stored in the period register 18. This residual time changes every time a task is added or eliminated.

The execute flag shows the time slot is valid or invalid. It is set as valid when time slot information is generated, as invalid when a resource of an access destination in a lock state becomes a waiting state while the task is being completed and, after that, as valid when it returns to an executable state from a waiting state. When an execute flag shows invalid, the time slot switching unit 14 judges that no time slot information is included.

The pointer shows the task management block corresponds to the time slot.

These time slot information 100, 110, 120 and so on form an alignment and the order shows the generation order of time slots.

<3. Task Memory Unit 13>

The task memory unit 13 memorizes task management blocks 200, 201 and so on corresponding to tasks assigned to time slots. The task management blocks 200, 201 and so on correspond to a task respectively and are information for managing the tasks.

The task management block 200 comprises task information 200a, a priority 200b, and a link address 200c.

The task information 200a includes a program starting address (or an address at which a program is resumed) and a stack pointer. The task information inputted by the task receiving unit is stored when generating a task management block. The task information 200a shows the execute address of a task suspended and the value of a stack pointer at the time point when switching tasks.

The priority 200b shows the priority of the task.

The link address 200c stores a pointer to the task management block that is the next component in the execute queue or the wait queue when the task management block is connected to the execute queue or the wait queue as the component.

More specifically, in the task management block corresponding to a type A task, the link address (210c etc.) is null when the task is in an executable state and is a pointer indicating the next component of the wait queue when the task is in a waiting state. In the task management block corresponding to a type B task, the link address 200c is a pointer indicating the next component forming the execute queue in the case where the task is in an executable state, and a pointer indicating the next component of the wait queue in the case where the task is in a waiting state.

<4. Time Slot Switching Unit 14>

The time slot switching unit 14 switches time slots when execution time of a task reaches to the assignment time in the present time slot. The timer control unit 30 notifies the time slot switching unit 14 that the time reaches the assignment time using a timeout. The time slot switching unit 14 that received the notification selects next time slot information. In the embodiment, next time slot information is selected in the alignment order. The time slot switching unit 14 obtains the assignment time from the selected time slot information and sets it at the timer control unit 30. This makes the count of the assignment time of next time slot get started.

<5. Task Selecting Unit 15>

The task selecting unit 15 saves an execute address of a task under execution, a stack pointer and the like in the task management block of the task as task information when switching time slots of the time slot switching unit 14 and there is an indication from the program under execution. Next, it takes out the task information from the task management block of the task to be completed next and outputs it to the execution control unit 40. At the same time, the context (register data and the like) of the task under execution is saved and the context of the task to be completed next is returned. This makes the task to be completed next in an execute state.

Figure 4:
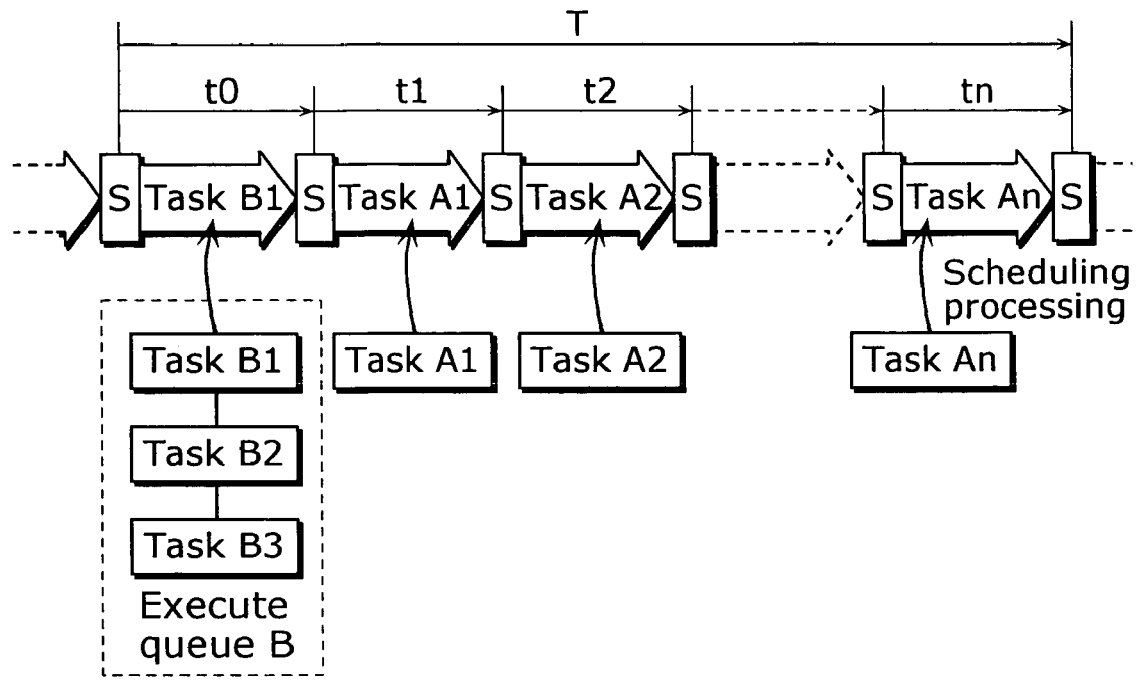
FIG. 4 is an illustration showing how task switching is completed by the time slot switching unit and the task selecting unit.

FIG. 4 is an illustration showing how tasks are switched by the time slot switching unit 14 and the task selecting unit 15. In the figure, "T" is the period stored in the period register 18, "t0" is the time slot corresponding to the time slot information 100 of the type B task and the length shows the assignment time. "t1" to "tn" are the time slots corresponds to "n" numbers of time slot information 110, 120 and so on that corresponds to "n" numbers of type A tasks respectively. "S" shows the scheduling processing for task switching performed by the time slot switching unit 14 and the task selecting unit 15. As shown in the figure, the task B1 with the highest priority in a plurality of type B tasks B1, B2 and B3 is selected to be completed in the scheduling processing at the time of starting the time slot t0. In the scheduling processing at the time of starting the time slot t0, task A1 corresponding to the time slot information 110 is completed. This is true of the time slot t2 to tn. In this way, a type A task is surely completed at least once during a period T.

Figure 5:
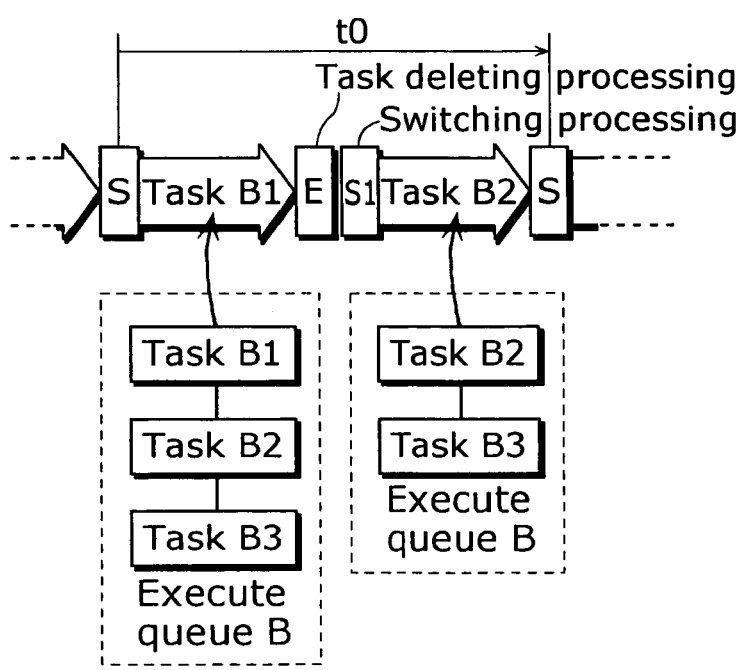
FIG. 5 is an illustration showing how the task switching is completed after a type B task completes.

Also, FIG. 5 is an illustration showing how to perform task switching in the case where a task under execution is completed in the time slot t0. The task B1 in the figure notifies the task selecting unit 15 of the fact in the case where it completes the processing. This processing makes the eliminating processing of the task B1 ("E" in the figure) and the switching processing of the tasks ("S1" in the figure) are performed. In the eliminating processing E, as the task B1 is completed, and the task management block of the task B1 is eliminated. In the switching processing S1, the task selecting processing 15 selects and executes the task B2 with the highest priority after eliminating the task management block of the task B1. In this way, tasks are completed in priority order in the time slot t0 where a plurality of type B tasks are assigned.

<6. Mutex Memory Unit 16>

The mutex (mutual exclusion) is the function for arbitration that enables one of tasks to access a resource when two or more tasks are in confliction. It is the function included in the mutex control unit 17 and realized by the object (program) that manages the resource while being in a lock state or in an unlock state. This function is set at every resource with a possibility that two or more tasks conflict with each other for the access. When a task succeeds the lock operation of the mutex, the mutex (or the resource) becomes locked, and the other tasks will have waited until the mutex is unlocked even when the other tasks try to perform a lock operation. In this way, the lock operation is succeeded, and the task can exclude other tasks. After performing the lock operation, the task performed the unlock operation, the other tasks can perform a lock operation. The task under execution, when accessing a resource, can access the resource only when the mutex corresponding to the resource succeeds in the lock operation. When it has already been in a lock state, it will have waited until it becomes an unlock state.

Figure 3:
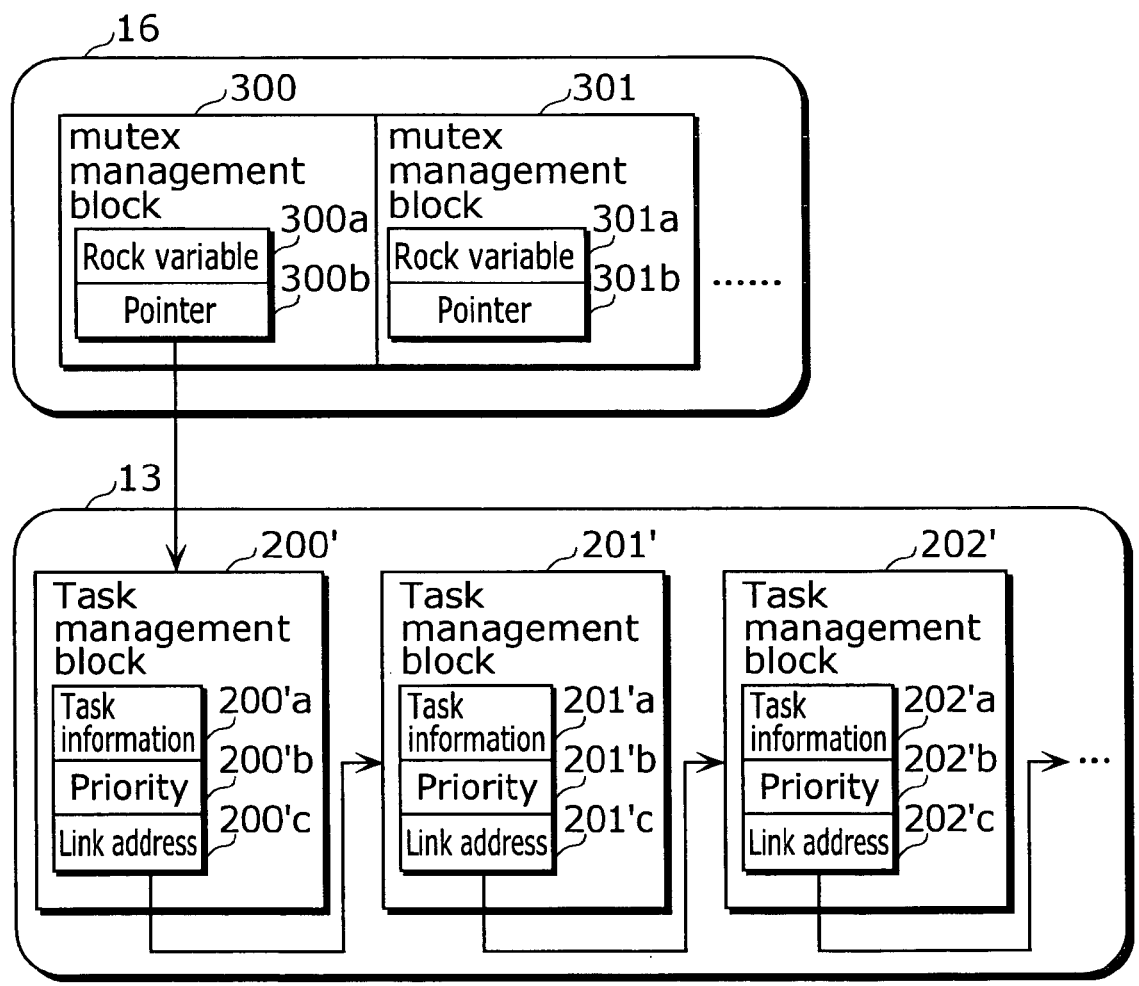
FIG. 3 is a diagram showing a mutex management block stored in the mutex memory unit and a wait queue stored in the task memory unit.

FIG. 3 is a diagram showing the mutex management blocks 300, 301 and so on that are stored in the mutex memory unit 16 and the wait queue stored in the task memory unit 13.

The mutex management blocks 300, 301 and so on in the figure are set corresponding to the respective resources with a possibility that two or more tasks conflict with each other for the access.

The mutex management block 300 includes a lock valuable 300*a* and a pointer 300*b*.

The lock variable 300*a* shows any of the two states 1: lock state or 0: unlock state. The initial value is 0 and a task needs to perform a lock operation so as to change the lock variable from an unlock state to a lock state. Only the task that performed the lock operation is allowed to perform the unlock operation corresponding to the lock operation.

The pointer 300*b* indicates the leading task management block of the wait queue showing the task that performed the lock operation in a lock state (the task that failed in the lock operation). The task management blocks 200', 201' and so on that are connected to the wait queue corresponds to the tasks that failed in the lock operation and form the wait queues that are connected by the link addresses 200'*c*, 201'*c* and so on respectively.

<7. Mutex Control Unit 17>

The mutex control unit 17 performs a lock variable operation and makes an operation request of the task management block to the task selecting unit 15, makes a notification to the time slot switching unit 14 and makes an operation request for an execute flag when performing the lock operation and the unlock operation of the mutex.

Figure 6:
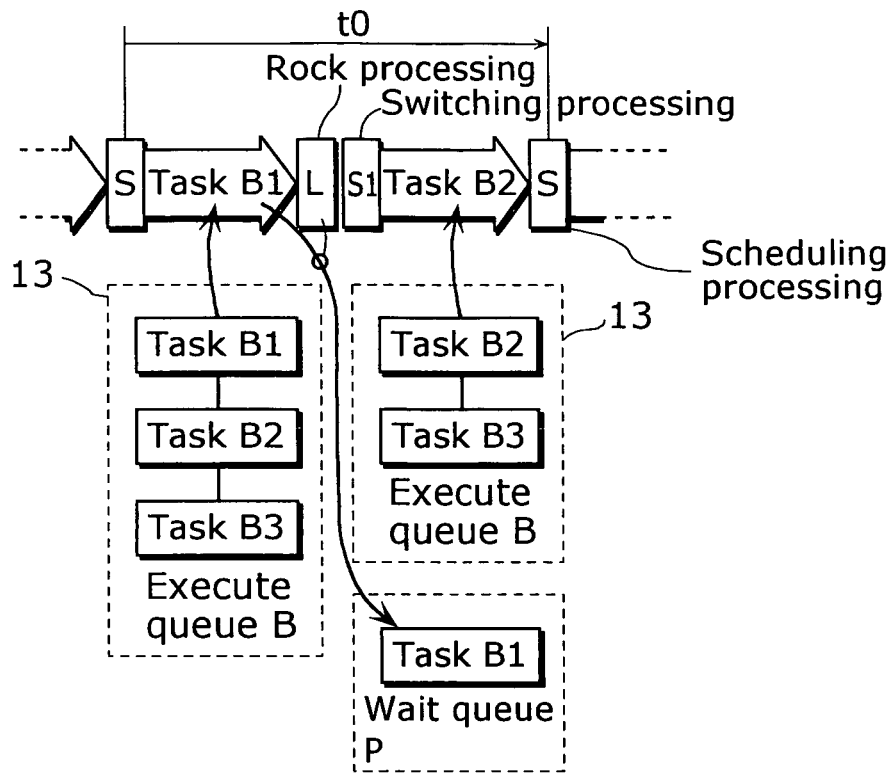
FIG. 6 is an illustration showing how the type B task fails in a lock operation.

FIG. 6 is an illustration showing how a type B task failed in the lock operation. The figure shows the case where a lock operation ("L" in the figure: lock processing) on the mutex failed, the mutex corresponding to the resource and the task B1 that is being completed in the time slot t0 is trying to access the resource. As the task B1 fails in the lock operation when the mutex has already been in a lock state, it is shifted from the execute queue to the wait queue of the task memory unit 13 by the lock processing L as shown in the figure, further, it is switched to the task B2 by the task switching processing S1. The task B1 will have eliminated from the scheduling target until the mutex changes from the lock state to the unlock state because it is eliminated from the execute queue.

In this way, the time slot t0 corresponding to a type B task is switched to the next task when the task under execution becomes a waiting state.

Also, when the task B1 succeeds in the lock operation in the lock processing, it is not switched to the task B2, and keeps being completed during the time slot t0 (it accesses a resource).

Figure 7:
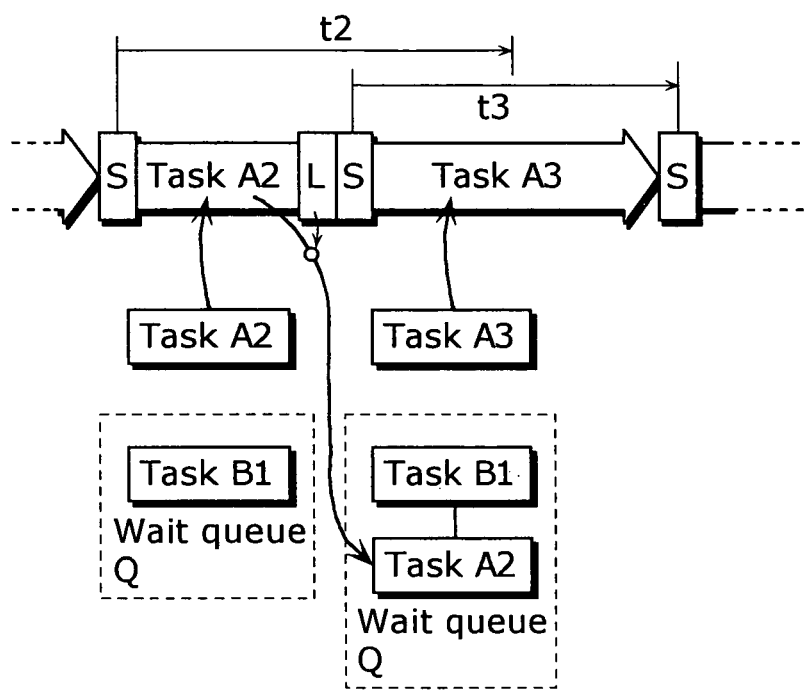
FIG. 7 is an illustration showing how a type A task fails in a lock operation.

FIG. 7 is an illustration showing how a type A task failed in the lock operation. In the figure, when the task A2 of a type A fails in the lock operation and is shifted to the wait queue, the time slot is switched because of the scheduling processing (the figure S) even when the time slot t2 does not reach the assignment time. As only one task is assigned to the time slot corresponding to the type A task, time slots are switched even when there remains time in the time slot.

Also, when the task A2 succeeds in the lock operation, time slots are switched at the time of reaching the assignment time to the time slot t2.

Figure 8:
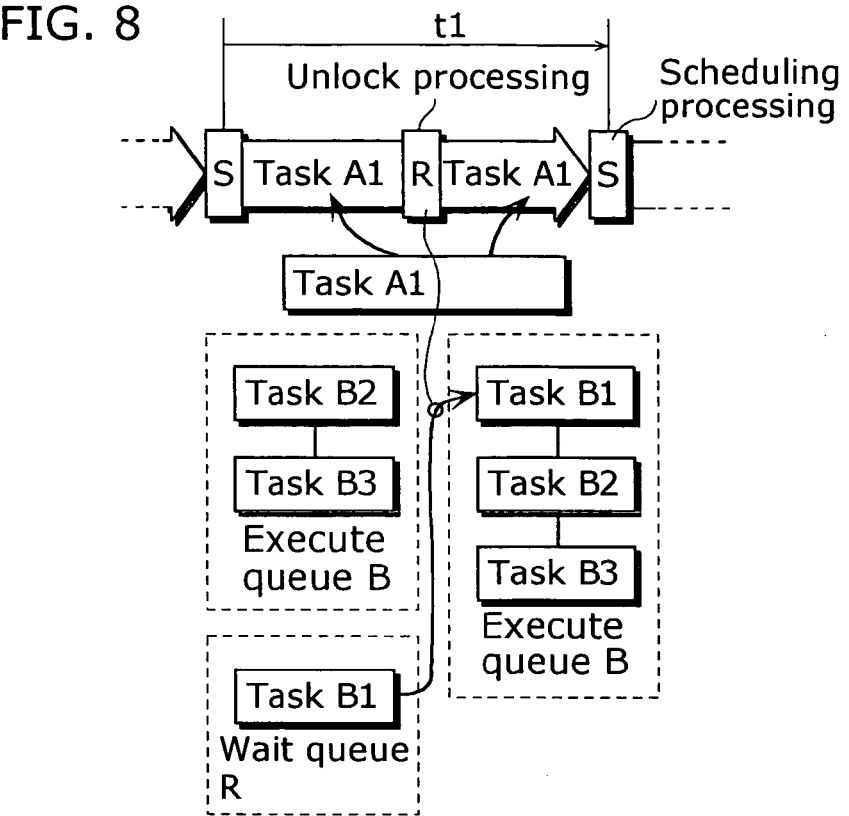
FIG. 8 is an illustration showing how a task unlocks.

FIG. 8 is an illustration showing how the task unlocks. As shown in the figure, when the task A1 under execution unlocks the mutex in a lock state, the task B1 of the wait queue R corresponding to the mutex is returned to the execute queue B by the unlock processing R. In this way, the task B1 is completed when the time slot t0 corresponding to the following task is selected.

Figure 9:
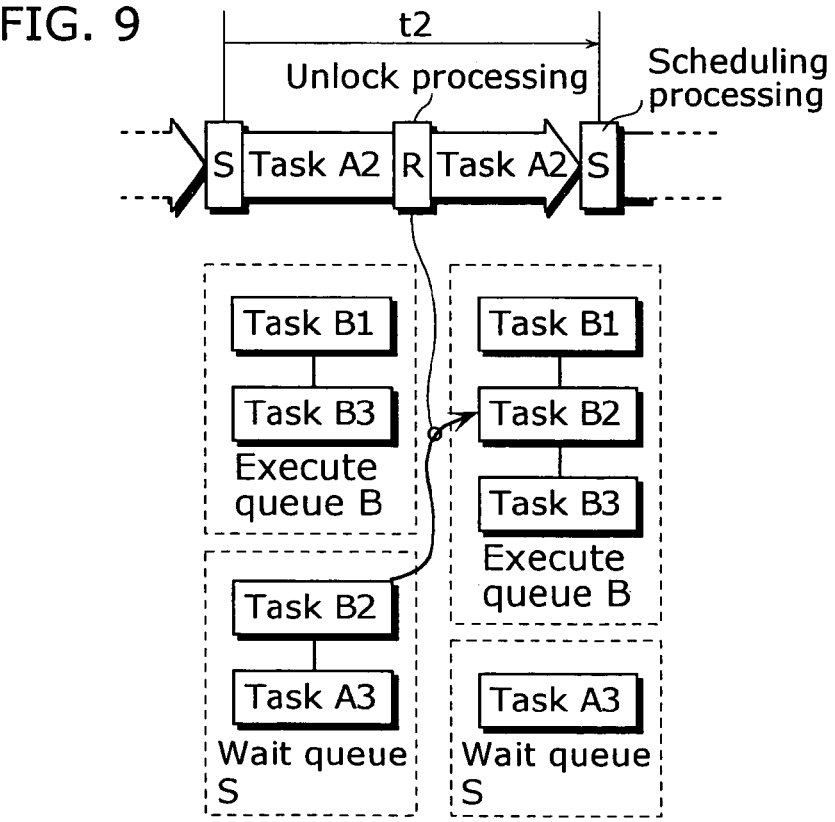
FIG. 9 is another illustration showing how a task unlocks.

FIG. 9 is another illustration showing how the task unlocks. In the figure, when the task A2 under execution unlocks the mutex in a lock state, the task B2 of the wait queues corresponding to the mutex is returned to the execute queue B by the unlock processing R. Unlike the FIG. 8, the task B2 is returned to the location between the task B1 and the task B3. This is because it is returned so that tasks are aligned in a priority order. This case is true of the case where, while the task B2 is in the wait queue, a task B1 with a priority higher than that of the task B2 is generated. When the time slot t0 is selected from here, the task B1 with the highest priority is selected and completed.

[Details of the Processing]

The details of the processing in the program execution apparatus of the present embodiment will be explained below: scheduling processing ("S" in the FIG. 4 to 9), mutex lock processing ("L" in the FIGS. 6 and 7), mutex unlock processing ("R" in the FIG. 8 and FIG. 9), task switching processing ("S1" in the FIGS. 5 and 6), task adding processing, and task deleting processing ("E" in the FIG. 5).

<1. Scheduling Processing>

Figure 10:
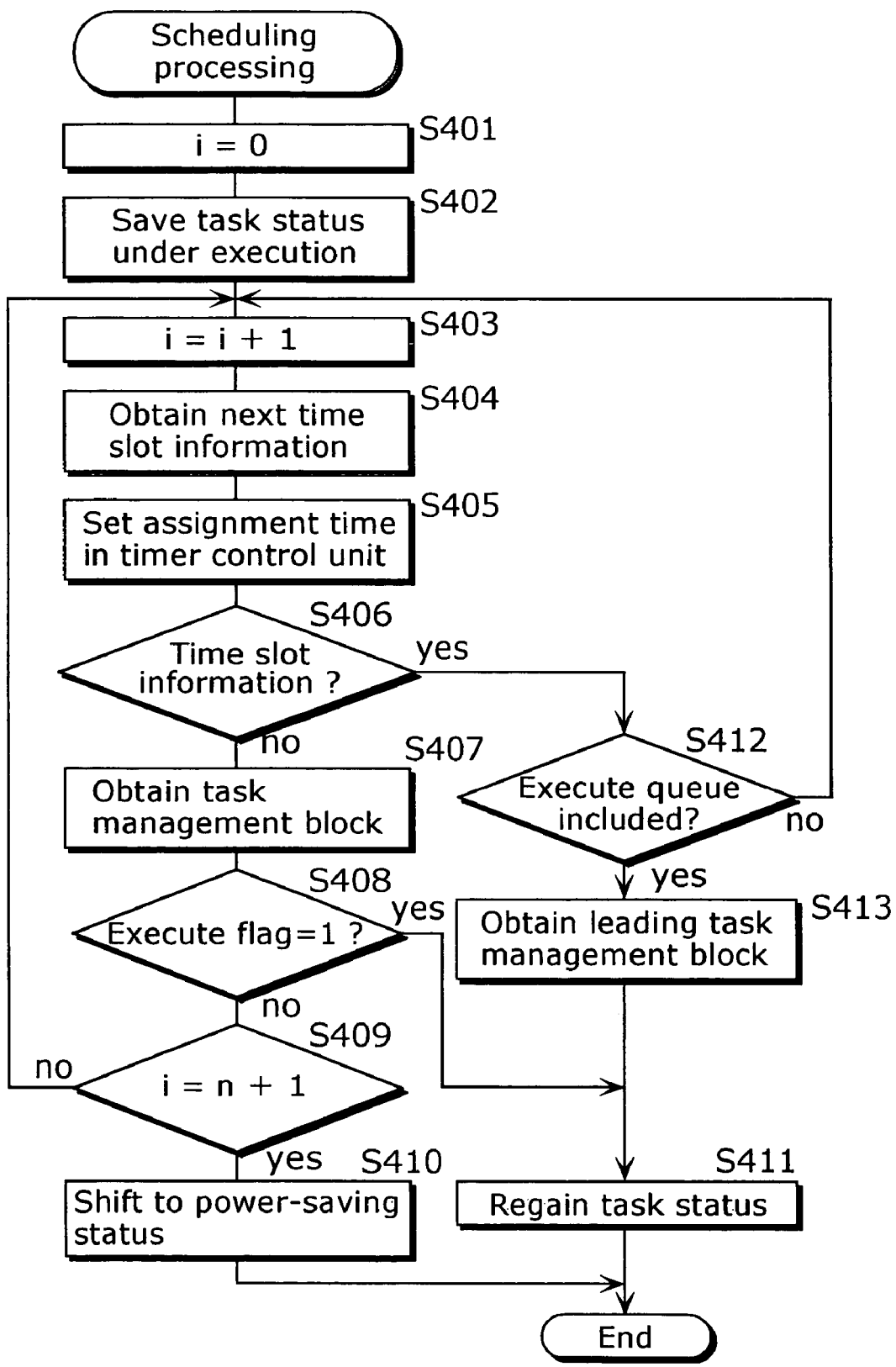
FIG. 10 is a flow chart showing the details of scheduling processing.

FIG. 10 is a flow chart showing the details of the scheduling processing. The scheduling processing in the figure is called and started when the timer control unit 30 notifies the time slot switching unit 14 of the timeout and the task under execution fails in the lock operation (refer to the FIG. 7). In the figure, "i" shows the variable for counting the time slot information with an invalid execute flag, and "(n+1)" shows the number of the existing time slot information.

First, the time slot switching unit 14 initializes the variable "i" used for a counter to "0" (S401) and saves the task status under execution in the task management block (S402).

Next, the task selecting unit 15 adds 1 to the variable "i" (S403), selects the time slot information next in the alignment of the time slot information, selects the leading component of the time slot information alignment when no next component is included and obtains the selected time slot information (S404). Further, the time slot switching unit 14 extracts the assignment time included in the selected time slot information and sets it at the timer control unit 30 (S405). In this way, the timer control unit 30 starts the count and keeps counting until it reaches the assignment time and a timeout occurs.

Further, the time slot switching unit 14 judges whether the obtained time slot information is the time slot information 100 or not. In other words, it judges whether the task to be completed next is type B or type A (S406).

It obtains the task management block indicated by the pointer in the time slot information when the judgment result is type A (S407), or it returns the task state according to the task information of the task management block (S411) when the execute flag in the time slot information is "1" (valid) (S408). In this way, the task is switched to a type A task.

Also, when the judgment result is type B, the time slot switching unit 14 judges whether the execution queue of the task management block is connected to the pointer in the time slot information 100 (whether the pointer is valid or invalid) (S412). When the execution queue is judged to be connected, it obtains the leading task management block with the highest priority (S413) and returns the task status according to the task information of the task management block (S411). In this way, the task is switched to the task with the highest priority in the type B tasks. Also, when the execution queue is judged to be not connected, this means that no executable type task B is included. In this case, it returns to S403 so as to select next time slot information.

When the execute flag is invalid in the above-mentioned S408 (S408: no), the time slot switching unit 14 returns to S403 and S404 again (S409: no) and selects next time slot. Further, when the repetitive processing shows that the "n+1" pieces of task management information is invalid (S409: yes), in other words, when no executable task is included, it makes the program execution apparatus a power-saving state (S410).

In this way, in the scheduling processing by the task scheduling unit 10, a type A task and a type B task perform different scheduling respectively. In other words, the task scheduling unit 10 switches tasks to the type A task assigned as only one task in the time slot when the time slots of type A (the time slots corresponding to the time slot information 1,2 and so on) is selected. Also, the task scheduling unit 10 switches a task to the task with the highest priority in a plurality of type B tasks when the time slot to which a type B task is assigned (the time slot corresponding to the time slot information 100).

Also, the switching processing S1 shown in FIG. 5 and FIG. 6 are substantially the same as the scheduling processing in FIG. 10. For example, in the scheduling processing of FIG. 10 may be started from the S412 in the switching processing S1.

<2. Task Adding Processing>

Figure 11:
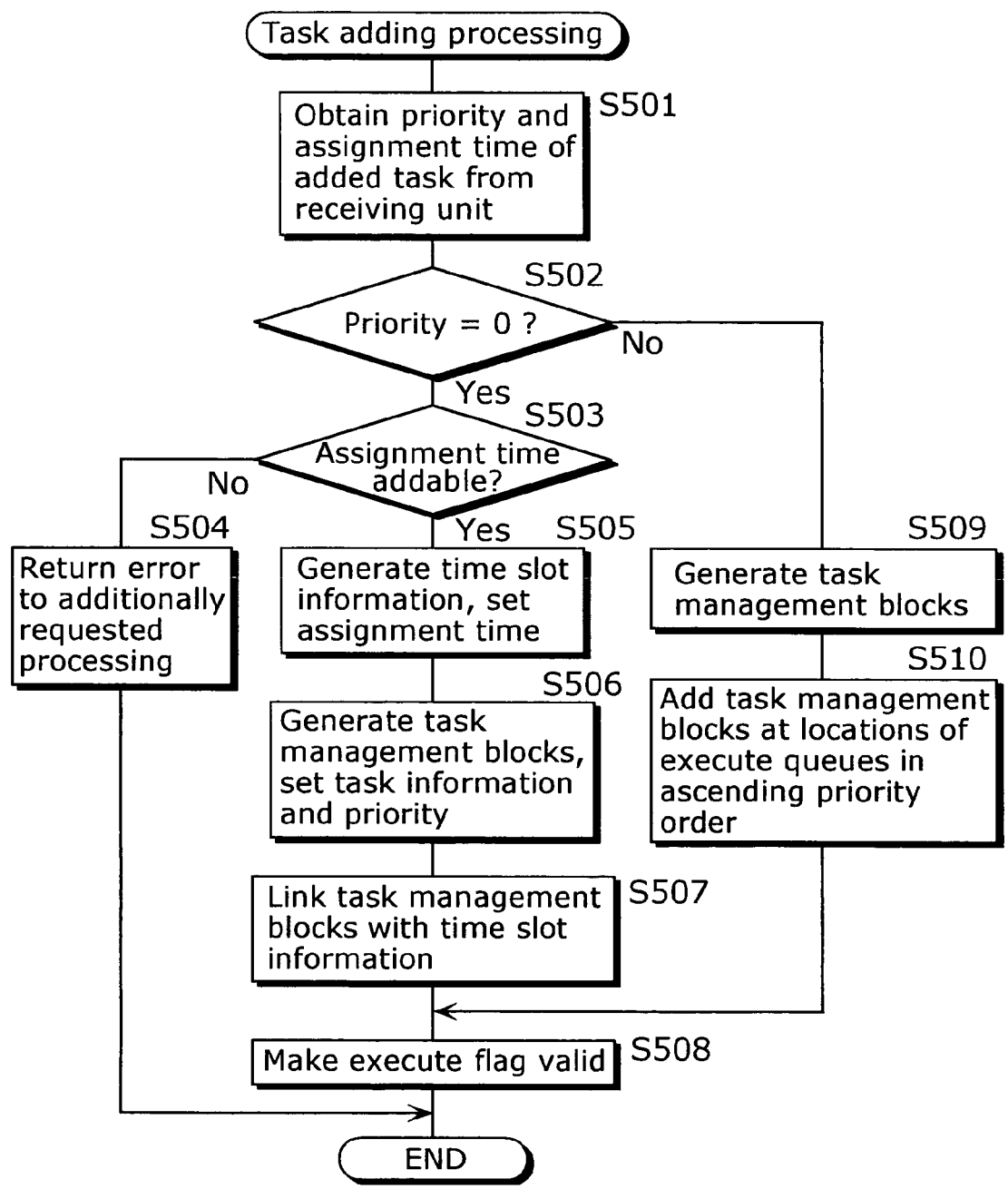
FIG. 11 is a flow chart showing the details of task adding processing.

FIG. 11 is a flow chart showing the details of the task adding processing in the task scheduling unit 10. This task adding processing is started at the time when a task adding request from a user operation or by a user program or the like occurs.

Upon the request for adding a task, the task receiving unit 11 obtains the task information of a task to be added, the priority and the assignment time (S501) and judges whether the type of the task to be added is type A or type B (whether the priority is 0 or not 0)(S502).

When the task to be added is judged to be type A, the task receiving unit 11 checks whether the time slot can be added or not. In other words, the task receiving unit 11 reads out, from the time slot memory unit 12, the assignment time in the time slot information 110, 120 and so on that correspond to type A tasks, calculates the total, and judges that it is possible to add a time slot corresponding to the task as long as the total sum including the assignment time of the task to be added to the total does not exceed the period value stored in the period register 18 (S503). When the total exceeds the period value, it returns the error to the addition request (S504).

When the time slot is judged to be addable, the task receiving unit 11 generates the time slot information where the assignment time and an execute flag ("0" in this time point) are set (S505) and generates a task management block including the task information and the priority (S506).

After generating the time slot information and the task management block, the task receiving unit 11 sets the storage location of the task management block at the pointer of the time slot information so as to show the correlation (S507). Lastly, the execute flag of the time slot is made to be valid (S508).

When it is judged that the task to be added is type B in the above-mentioned S502, the task receiving unit 11 generates a task management block of the task to be added (S509) and adds it to the execute queue corresponding to the time slot information 100. When adding it to the execute queue, the location to which the execute queue is added is searched and the task management block is added (S510) in a way that task management blocks are aligned in the priority order from the head of the execute queue. Also, "1" is set at the execute flag in the time slot information 100 (S508).

In this way, in the addition processing, new time slot information and a new task management block are added to the existing time slot information and task management blocks (refer to FIG. 2) when the task to be added is type A and new task management blocks are added to the locations according to the priorities of the execute queues when the task to be added is type B.

Also, the task deleting processing E shown in FIG. 5 deletes the time slot information corresponding to the task and the task management block when the task to be deleted is type A and deletes the time slot information and the task management block from the task management block execute queue corresponding to the task when the task to be deleted is type B.

<3. Mutex Lock Processing>

Figure 12:
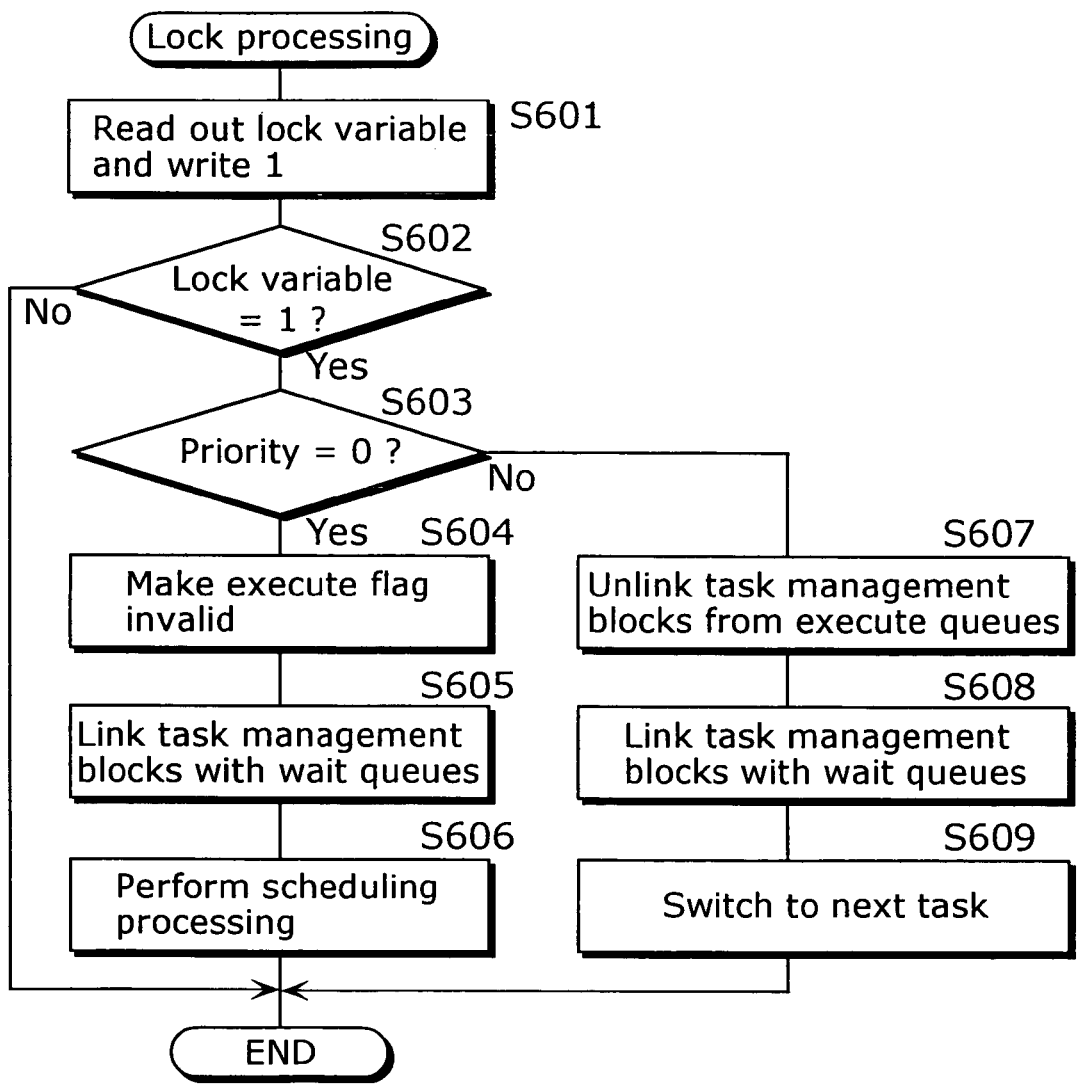
FIG. 12 is a flow chart showing the details of lock processing by a mutex control unit.

FIG. 12 is a flow chart showing the details of lock processing performed by the mutex control unit 17. This lock processing is the lock processing L in FIG. 6 and FIG. 7, and the processing called by the task under execution so as to lock the mutex corresponding to the resource just before the task under execution accesses one of the resources.

Upon receiving the call made by the task under execution, the mutex control unit 17 reads out the lock variable to the mutex management block corresponds to the resource and writes valid value of "1" (S601). The reading-out and writing-in is completed in a single instruction in order to prevent any inconsistence value from being generated because of the same processing performed by the other tasks between that reading-out and writing-in. This is executable by the read-modify-write instruction implemented in the processor.

When the read-out lock variable is "0" (unlocked state) (S602: yes), the lock operation is a success, and the lock processing has completed because "1" has already been set by the above-mentioned writing-in. In this way, execution control returns to the task from which lock processing is called, and the task can possess and access the resource corresponding to the mutex.

When the read-out lock variable is "1" (lock state)(S602: no), the task as the source call cannot access the resource until the mutex is unlocked because the resource is possessed by another task. In this case, the mutex control unit 17 judges whether the task as the source call is type A or type B.

When the judgment result is type A (priority is 0)(S603: yes), the mutex control unit 17 makes the execute flag of the corresponding time slot information invalid (S604). In this way, the time slot information is eliminated from the scheduling target. In addition, the mutex control unit 17 eliminates the task management block of the task as a source call from the execute queue and links it with the wait queue of the mutex management block (S605). The reason why it is linked with the wait queue is to show which mutex is in an unlock waiting state (which resource is in a possession unlock waiting state). Further, the mutex control unit 17 calls the scheduling processing S (S606). In this way, the time slot is made switched to the next one by compulsion even when it is in the middle of the assignment time in the time slot (refer to FIG. 7).

Note that it is possible to change location of the pointer of the time slot information so that it points at the head of the execute queue of the type B task instead of making the execute flag invalid in S604. In this way, the type B task is also completed in the time slot.

When the judgment result is type B (priority is not 0) (S603: no), the mutex control unit 17 eliminates the task management block of the task as a source call from the execute queue (S607). In this way, the task is eliminated from the scheduling target. In addition, the task management block is added to the wait queue of the mutex management block (S608) so as to show that it is waiting to know which resource in a possession state is unlocked. Further, calling the task switching processing S1 switches the task to the next one (S609). In this way, the next task is completed in the residual time of the assignment time of the time slot (refer to FIG. 6).

<4. Mutex Unlock Processing>

Figure 13:
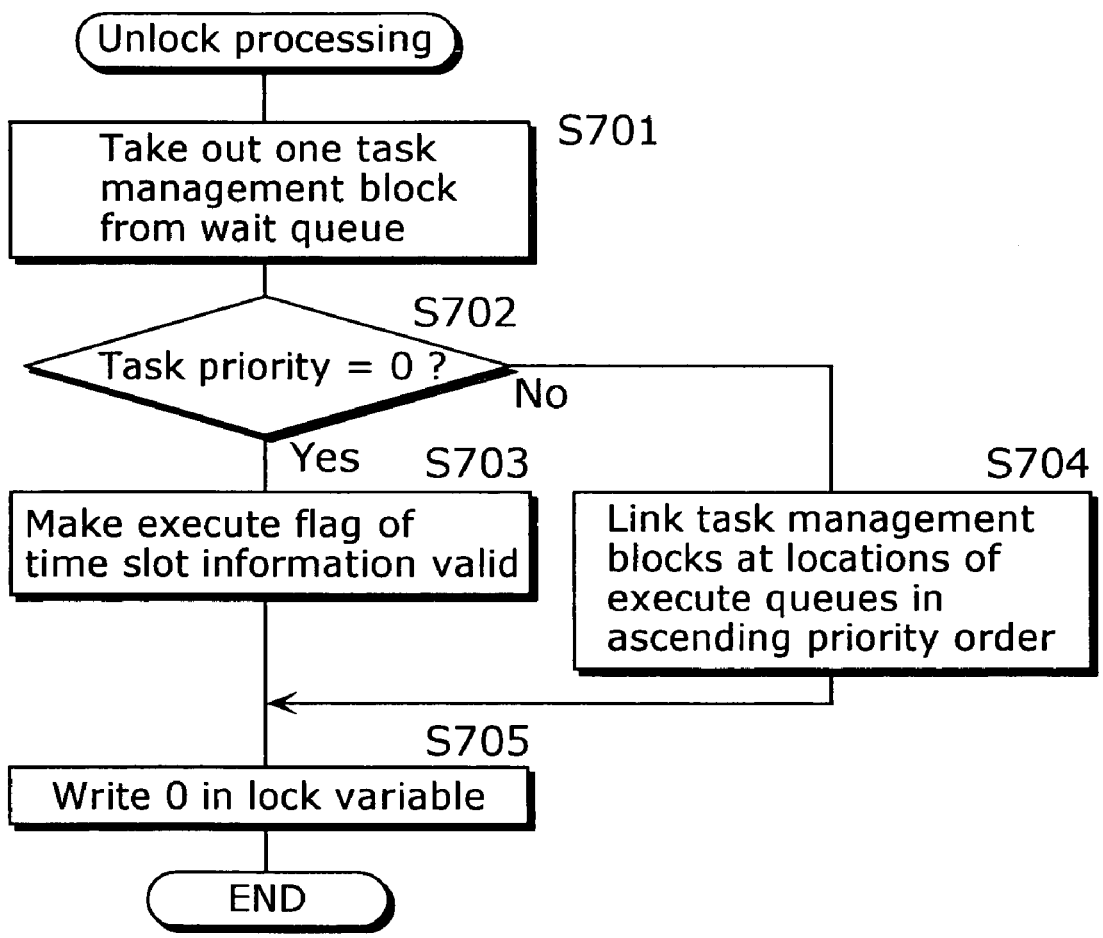
FIG. 13 is a flow chart showing the details of mutex unlock processing by the mutex control unit.

FIG. 13 is a flow chart showing the details of the mutex unlock processing performed by the mutex control unit 17. This processing is an unlock processing R shown in FIG. 8 and FIG. 9 and is a processing to be called by the task under execution when a task under execution completes accessing a resource.

On being called, the mutex control unit 17 extracts the leading task management block from the wait queue of the mutex management block corresponding to the resource (S701) and judges the type of the task in a waiting state based on the priorities in the extracted task management block (S702). The mutex control unit 17 changes the execute flag of the time slot information corresponding to the extracted task management block to "1" (valid) when the priority is "0" (type A)(S703). The time slot information corresponding to the extracted task management block may be identified, for example, by searching the task management block with the same task information as the extracted task management information out of the task management blocks connected to the time slot information whose execute flag is "0". Further, the mutex control unit 17 writes "0" in the lock variable in the mutex management block (makes the mutex an unlock state) (S705).

Also, when the priority of the task management block extracted from the wait queue is not "0" (type B), the mutex control unit 17 adds the task management block to the execute queue of the type B task. When adding the task management block to the execute queue, it adds the task management block to the location in priority order from the head (S704) and writes "0" in the lock variable in the mutex management block.

In this way, as the task in a waiting state returns to the executable state, it becomes the scheduling target and can perform the lock operation of the resource when it becomes an executable state next.

As explained up to this point, the program execution apparatus in this embodiment can assure the processing performance in series because type A tasks are assigned to time slots one by one, and as a result, each of the type A tasks are selected and completed at least once in a period. On the other hand, in the case of type B tasks, a plurality of type B tasks are assigned to a time slot, and as a result, they are completed in priority order although its processing performance is not assured in series. As a result, a programmer does not need to take into account the priorities of the tasks with a need to satisfy the processing performance in series and classifies these tasks into type A, while it classifies the tasks that require little processing performance into type B. In this way, it becomes unnecessary to assign all the task priorities respectively, which makes it possible to facilitate the program designing for securing the processing performance and secure the flexibility in the program designing.

Note that an example where the specification of the assignment time is included in the task information has been explained in the above-mentioned embodiment, but the structure may be the one where the task receiving unit 11 receives the specification of the assignment time from outside. Also, predetermined assignment time may be used when no assignment time is specified.

Also, as to the type A tasks, a time slot is assigned to a task, but the structure may be the one where two or more time slots are assigned to a task.

Further, as to the type B tasks, a time slot is assigned to a plurality of tasks, but any one of the fixed two or more time slots may be assigned to them. For example, the structure may be the one where tasks with an odd-number priority are assigned to the time slot A and tasks with an even-number priority are assigned to the time slot B.

Also, it is possible to establish a column of the possessed tasks for recording the task names locked in the mutex management blocks, rewrite new task names in the column of the possessed tasks extracted from the wait queues when the lock is unlocked, and keep the lock variable valid. In this case, tasks stored in the column of the possessed tasks do not need to perform any lock operation and become possible to use the resource surely.

Figure 14:
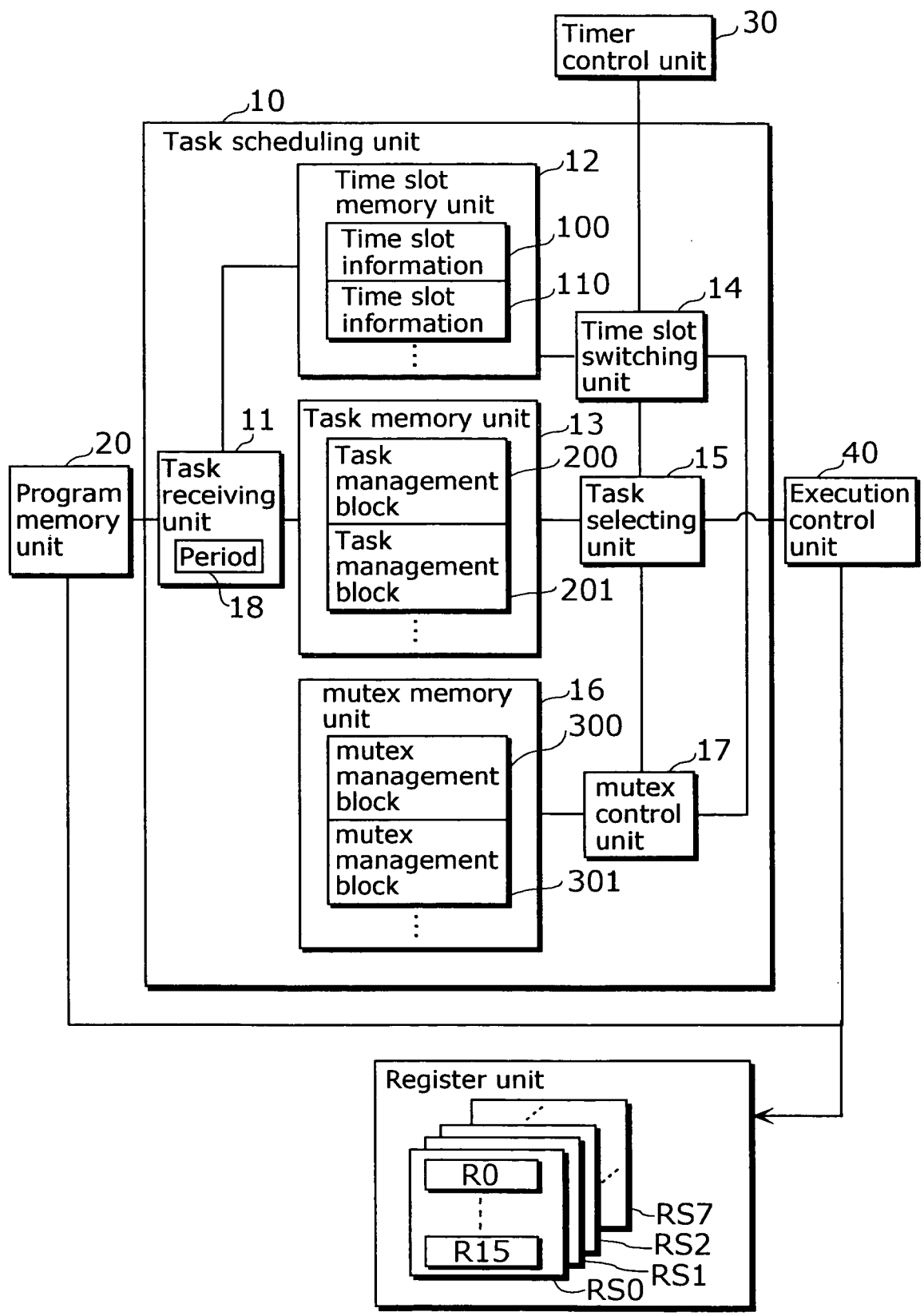
FIG. 14 is a diagram showing the structure of a variation of the program executing apparatus.

Lastly, a variation of the program execution apparatus is shown in FIG. 14. It is different from the structure of the program execution apparatus shown in FIG. 1 in that eight register sets RS0 to RS7 that can be switched at the same time of switching time slots.

A register set corresponds to a time slot and stores the context of a task.

As a plurality of type B tasks correspond to a register set, the task scheduling unit 10 saves and returns a context to the register set RS0 as in the above-mentioned embodiment when switching to the time slot of the type A task.

As the type A task corresponds to the register set, the task scheduling unit 10 switches register sets instead of saving and returning the context when switching to the time slot of the type A task. In this case, saving and returning the context becomes unnecessary, and thus it becomes possible to accelerate task switching. This makes it possible to extremely reduce the period for the period register 18 and the assignment time of the time slot. For example, it is also possible to reduce the time of the time slot for a type A task to the time approximately equal to the time for saving and returning a context and reduce the period.

Note that the number of the register sets in FIG. 14 can be arbitrary, when time slots outnumber register sets, for example, a plurality of time slots use any of register sets, and as to the register set, the structure should be the one where the context is saved and returned when switching time slots.

Also, the number of the register sets may be "2" in FIG. 14. In this case, one of the register sets is used by the task under execution as the main register sets, and the other register set is used as the alternate register sets and is for returning the context of the task to be completed next using background processing. This structure makes it possible to return the context using background processing in idle status and to accelerate task switching by efficiently switching two register sets of a main register and an alternate register.

Further, when the number of the register sets is "2", if there is a task that returned to an executable state from a waiting state by unlock and the task is the task to be completed next, there is a possibility that the context returned to the alternate register is different from the context of the task to be completed next. A preventive measure for this can be taken in the following way: in the case of adding a step of setting, in the task management block of the task, a notification flag for notification of the existence of the task that returned to the executable state from the waiting state just before S705 in the unlock processing (refer to FIG. 13) and showing that the notification flag is the task that returned to an executable state from a waiting state just before S411 in the scheduling processing (refer to FIG. 10), the structure may be the one with an additional step of switching register sets of a main register and an alternate register after returning the context of the task to the alternate register.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A task switching apparatus for switching tasks to be executed in a processor by switching time slots to which a task is assigned, comprising:

a first generating unit operable to assign, on a one-to-one basis, first time slots in a plurality of time slots within a period to each first task among a plurality of first tasks whose assignment time is specified, and generate time slot information including an assignment time of each first task corresponding to each of the first time slots;

a second generating unit operable to assign a plurality of second tasks, each with a priority classification, to a single second time slot among the plurality of time slots within the period, and generate time slot information including an assignment time and at least one priority classification of at least one second task assigned to the second time slot;

a time slot switching unit operable to switch time slots when an execution time of a task reaches an assignment time;

a third generating unit operable to generate task management information including an address of each of tasks assigned to a time slot;

a storing unit operable to store the generated time slot information and task management information in association with each other;

a selecting unit operable to select time slot information stored in said storing unit at least once in the period;

a control unit operable to allow an execution of a task indicating task management information corresponding to the time slot information when time slot information to which a first task is assigned is selected, select a task from a plurality of task management information corresponding to the time slot information according to priority classifications and allow an execution of the task indicated by the selected task management information when time slot information to which at least one second task is assigned is selected;

a memory unit configured to store programs for causing said first generating unit, said second generating unit, said time slot switching unit, said third generating unit, said storing unit, said selecting unit, and said control unit to perform their respective functions; and a processor which executes the programs.

2. The task switching apparatus according to claim 1, wherein said storing unit stores task management information of the plurality of second tasks as a queue in which the task management information is aligned in order of priority classification, and said control unit selects tasks corresponding to leading task management information of the queue.

3. The task switching apparatus according to claim 2, wherein said second generating unit sets a difference between the period and total assignment times of all first tasks in the corresponding time slot information as an assignment time of the second time slot.

4. The task switching apparatus according to claim 3, wherein said second generating unit recalculates the residual time so as to determine an assignment time of the second time slot every time said first generating unit assigns a time slot to a new first time slot.

5. The task switching apparatus according to claim 4 wherein said storing unit further stores lock information regarding whether a resource capable of being accessed by a task is in a lock state, the task switching apparatus further comprising:
   a queue managing unit operable to dissociate task management information of the task stored in said storing unit from time slot information when a task under execution attempts to access a resource in a lock state, have said storing unit store the task management information as a wait queue, and have said storing unit store task management information in a wait queue in association with time slot information when the resource is unlocked.

6. The task switching apparatus according to claim 5 wherein the processor includes at least two register sets for storing contexts of tasks, further comprising:
   a register set switching unit operable to prepare one of the register sets used for a task under execution, return the context of a task to be executed next to another register set using background processing and switch register sets when switching time slots.

* * * * *